United States Patent [19]
Yoshida et al.

[11] Patent Number: 5,886,987
[45] Date of Patent: Mar. 23, 1999

[54] FDD/CDMA TRANSMISSION/RECEPTION SYSTEM

[75] Inventors: Shousei Yoshida; Akihisa Ushirokawa, both of Tokyo, Japan

[73] Assignee: NEC Corporation, Japan

[21] Appl. No.: 683,675

[22] Filed: Jul. 17, 1996

[30] Foreign Application Priority Data

| Jul. 19, 1995 | [JP] | Japan | 7-182305 |
| Dec. 26, 1995 | [JP] | Japan | 7-339155 |

[51] Int. Cl.[6] ............................................... H04J 13/00
[52] U.S. Cl. ...................................... 370/318; 370/335
[58] Field of Search .................................. 370/310, 318, 370/319, 320, 328, 335, 342, 343; 375/205, 208, 209, 210, 295, 299, 316, 346, 349; 455/31.1, 63, 67.1, 68, 69, 38.3, 422, 13.3, 13.4, 517

[56] References Cited

U.S. PATENT DOCUMENTS

| 4,835,790 | 5/1989 | Yoshida et al. | 375/227 |
| 5,267,262 | 11/1993 | Wheatley, III | 375/200 |
| 5,347,535 | 9/1994 | Karasawa et al. | 370/342 |
| 5,412,686 | 5/1995 | Lijg | 375/200 |
| 5,485,486 | 1/1996 | Gilhousen et al. | 375/205 |
| 5,548,835 | 8/1996 | Sasaki | 455/277.1 |
| 5,559,789 | 9/1996 | Nakano et al. | 370/342 |
| 5,574,983 | 11/1996 | Douzono et al. | 455/69 |
| 5,581,547 | 12/1996 | Umeda et al. | 370/342 |
| 5,590,409 | 12/1996 | Sawahashi et al. | 455/69 |
| 5,598,404 | 1/1997 | Hayashi et al. | 370/342 |
| 5,604,766 | 2/1997 | Dohi et al. | 375/200 |
| 5,646,937 | 7/1997 | Nakano et al. | 370/252 |

FOREIGN PATENT DOCUMENTS

| 2200018 | 8/1990 | Japan . |
| 7-30519 | 1/1995 | Japan . |
| 8-56213 | 2/1996 | Japan . |

OTHER PUBLICATIONS

K.S. Gilhousen et al., "On the Capacity of a Cellular CDMA System", IEEE Transaction of Vehicular Technology, vol. 40, No. 2, May 1991, pp. 303–312.

S. Sampei, "Rayleigh Fading Compensation Method for 16QAM Modem in Digital Land Mobile Radio Systems", The Institute of Electronics, Information and Communication Engineers, '89/1, vol. J 72–B–11, No. 1, pp. 7–15.

K. Miya, et al., "A Base–Station–Based Diversity Scheme for CDMA/TDD Systems", The Institute of Electronics, Information and Communication Engineers, vol. 94, No. 239, Sep. 17, 1994, pp. 25–30.

*Primary Examiner*—Chi H. Pham
*Assistant Examiner*—Kwang B. Yao
*Attorney, Agent, or Firm*—Ostrolenk, Faber, Gerb & Soffen, LLP

[57] ABSTRACT

An FDD/CDMA transmission/reception system includes a CDMA transmitter and a CDMA receiver. The CDMA transmitter includes a plurality of transmission antennas, signal transmission units for transmitting transmission signals weighted by different values to the respective transmission antennas, and pilot signal transmission units for transmitting a plurality of different pilot signals to the respective transmission antennas. The CDMA receiver includes a reception unit for obtaining one received signal from the transmission signals from the plurality of transmission antennas of the CDMA transmitter in consideration of reception quality, and a unit for transmitting antenna control signals corresponding to reception power values of the received pilot signals to the CDMA transmitter.

15 Claims, 11 Drawing Sheets

PRIOR ART

F I G. 11B

PRIOR ART

FDD/CDMA TRANSMISSION/RECEPTION SYSTEM

BACKGROUND OF THE INVENTION

The present invention relates to a CDMA (Code Division Multiple Access) transmission/reception system and, more particularly, to a CDMA transmission/reception system generally used for a forward link (communication from a base station to a mobile state) in a mobile communication system.

A code division multiple access (CDMA) scheme based on a direct spread technique has received a great deal of attention as a multiple access scheme in a future mobile communication system. This is because the CDMA scheme has the potential for a great increase in subscriber capacity. In a system using the CDMA scheme, each user multiplies information signal by a unique spread code to spread the signal into a signal in a wide frequency band, and transmits the resultant signal to a transmission channel. On the reception side, the code multiple signal undergoes a de-spread process, and the desired user signal is detected afterward.

Figure 11A:
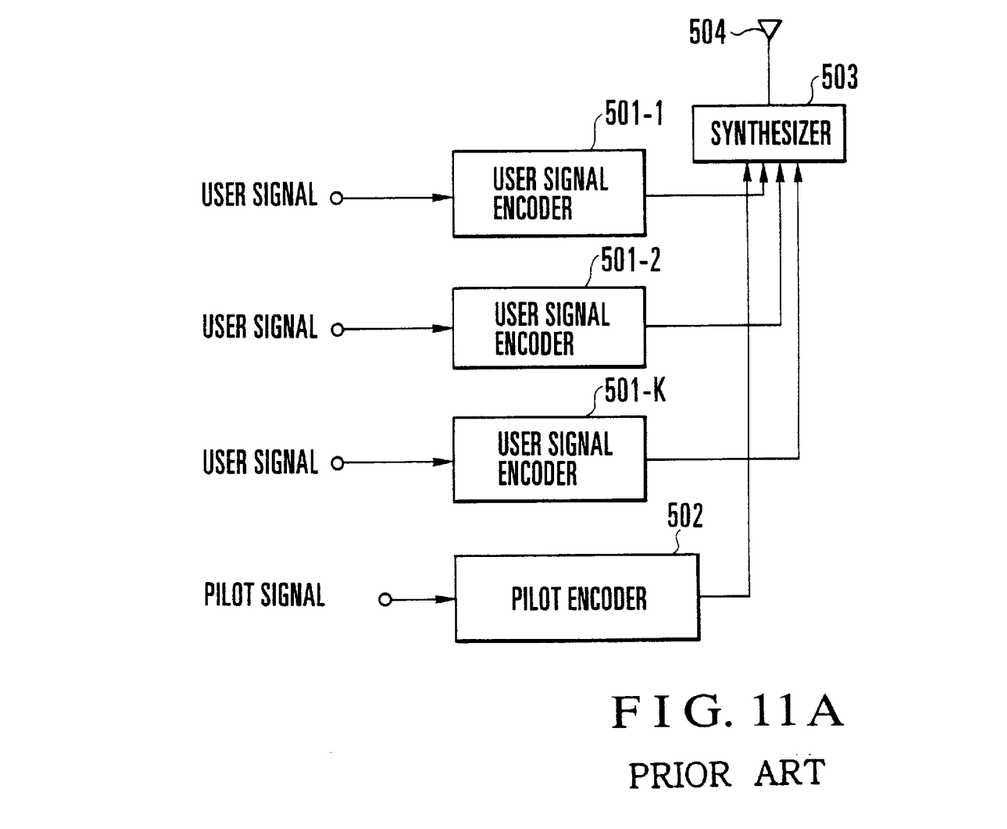
Figure 11B:
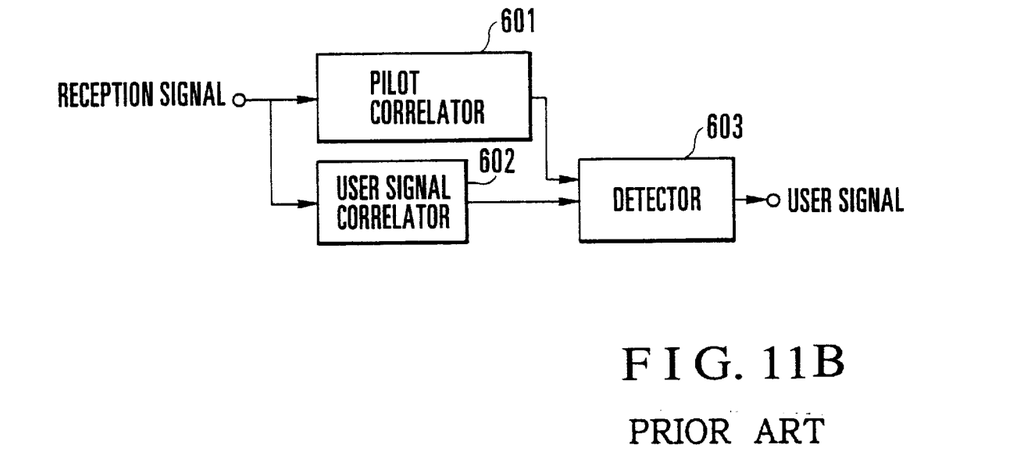

FIGS. 11A and 11B show a conventional CDMA transmission/reception system. FIG. 11A shows a transmitter. FIG. 11B shows a receiver. In this transmission/reception system, the transmitter multiplexes user signals to receivers, i.e., mobile stations, altogether. In the transmitter, the user signals and pilot signals are multiplexed to allow the receiver to easily estimate the reception timings of the respective user signals and transmission channel parameters.

Referring to FIG. 11A, in the transmitter, user signal spreading circuits 501-1 to 501-K (K is an integer not less than 1; the same applies to the following description) spread the respective user signals with unique codes assigned to the respective users. A pilot signal spreading circuit 502 spreads a pilot signal with a unique code. A signal combiner 503 multiplexes the spread user signals supplied from the user signal spreading circuits 501-1 to 501-K and the pilot signal from the pilot signal spreading circuit 502. A transmission antenna 504 transmits an output from the combiner 503.

Referring to FIG. 11B, in the receiver, a pilot correlator 601 detects the pilot signal from the received signal transmitted from the transmission antenna 504 and received by a reception antenna (not shown), and extracts the reception timings of the user signals and transmission channel parameters. Similarly, a user signal correlator 602 detects a desired user signal from the received signal. A coherent detector 603 demodulates a user signal by using the transmission channel parameters extracted from the pilot signal. Note that illustrations of an RF (radio frequency) transmitter and a receiver are omitted from FIGS. 11A and 11B.

In a mobile communication environment, fading caused in a transmission channel generally becomes a factor for a deterioration in reception quality. As a means for improving the reception quality in a fading environment, for example, an antenna diversity scheme is effective, which is disclosed in Japanese Patent Application No. 6-189293 (Title of the Invention: "Code Division Multiple Receiver") which is a pending application filed by the present applicant. This scheme is a selection scheme in which a plurality of antennas are arranged in a receiver to have independent spatial correlation characteristics, and a signal having good quality is selected from signals received by the antennas, or a combining scheme in which signals are appropriately weighted and combined. With the use of such a scheme, the reception characteristics in a fading environment can be improved. However, it is difficult to apply the scheme to a mobile station, because a complicated apparatus is required.

In the CDMA transmission/reception system shown in FIGS. 11A and 11B, in detecting a desired signal, interference occurs owing to the correlation between the desired user code and other users codes. Various interference cancellation schemes have been proposed (e.g., Japanese Patent Laid-Open No. 7-030519) to cancel such interference in a receiver and attain high reception quality. However, it is not easy to apply an interference canceler to a mobile station, considering a shortage of information associated with other users and the apparatus size. Therefore, there is a demand for a means for obtaining an interference reduction effect without applying an interference canceler to a mobile station.

In order to meet this demand, there has recently been proposed a scheme of obtaining a diversity effect and an interference reduction effect without using a plurality of antennas and an interference canceler in a mobile station. This scheme is disclosed in Miya, Hayashi, Kato, and Homma, "A Base-Station-Based Diversity Scheme for CDMA/TDD Systems", TECHNICAL REPORT OF IEICE. RCS94-73, September 1994. The scheme is applied to a TDD (Time Division Duplex) scheme, i.e., a scheme in which communication is performed by time division of the same radio frequency in transmission and reception, and the same transmission channel is used for transmission and reception. In a base station, antenna diversity is performed in a reverse link, and forward link transmission is performed through an antenna exhibiting the most effective reception characteristics. With this operation, a diversity effect can be obtained in a mobile station without using a plurality of antennas.

In the CDMA scheme, with the user of such a transmission diversity scheme, an interference reduction effect can be expected for the following reason. A desired signal is always transmitted through an optimal transmission channel, whereas a signal of another users, i.e., interference, is not always transmitted through an optimal transmission channel for the desired user. A decrease in interference power can be attained unlike the case wherein all user signals are transmitted from a single antenna as shown in FIGS. 11A and 11B.

As has been described above, in the conventional CDMA transmission/reception system shown in FIGS. 11A and 11B, a complicated mobile station is required to improve the fading and interference resistance characteristics. Although there are some merits in the method of performing transmission diversity using the TDD scheme, a complicated system is required because synchronization in transmission and reception must be established between base stations.

In contrast to this TDD scheme, an FDD (Frequency Division Duplex) scheme allows a simple system. In this scheme, different radio frequencies are used in transmission and reception. A demand therefore arises for a means for obtaining the above effect in the FDD scheme.

SUMMARY OF THE INVENTION

It is, therefore, an object of the present invention to provide an FDD/CDMA transmission/reception system which can realize transmission diversity in the FDD/CDMA scheme and improve fading and interference resistance characteristics.

In order to achieve the above object, according to the present invention, there is provided an FDD/CDMA transmission/reception system comprising a CDMA transmitter and a CDMA receiver, the CDMA transmitter including a plurality of transmission antennas, signal transmission means for transmitting transmission signals weighted by different values to the respective transmission antennas, and pilot signal transmission means for transmitting a plurality of different pilot signals to the respective transmission antennas, and the CDMA receiver including reception means for obtaining one received signal from the transmission signals from the plurality of transmission antennas of the CDMA transmitter in consideration of reception quality, and means for transmitting antenna control signals corresponding to reception power values of the received pilot signals to the CDMA transmitter.

BRIEF DESCRIPTION OF THE DRAWINGS

FIGS. 11A and 11B are block diagrams showing the arrangement of a conventional CDMA transmission/reception system, in which FIG. 11A shows the arrangement of a transmitter, and FIG. 11B shows the arrangement of a receiver.

DESCRIPTION OF THE PREFERRED EMBODIMENTS

The present invention will be described below with reference to the accompanying drawings.

Figure 1:
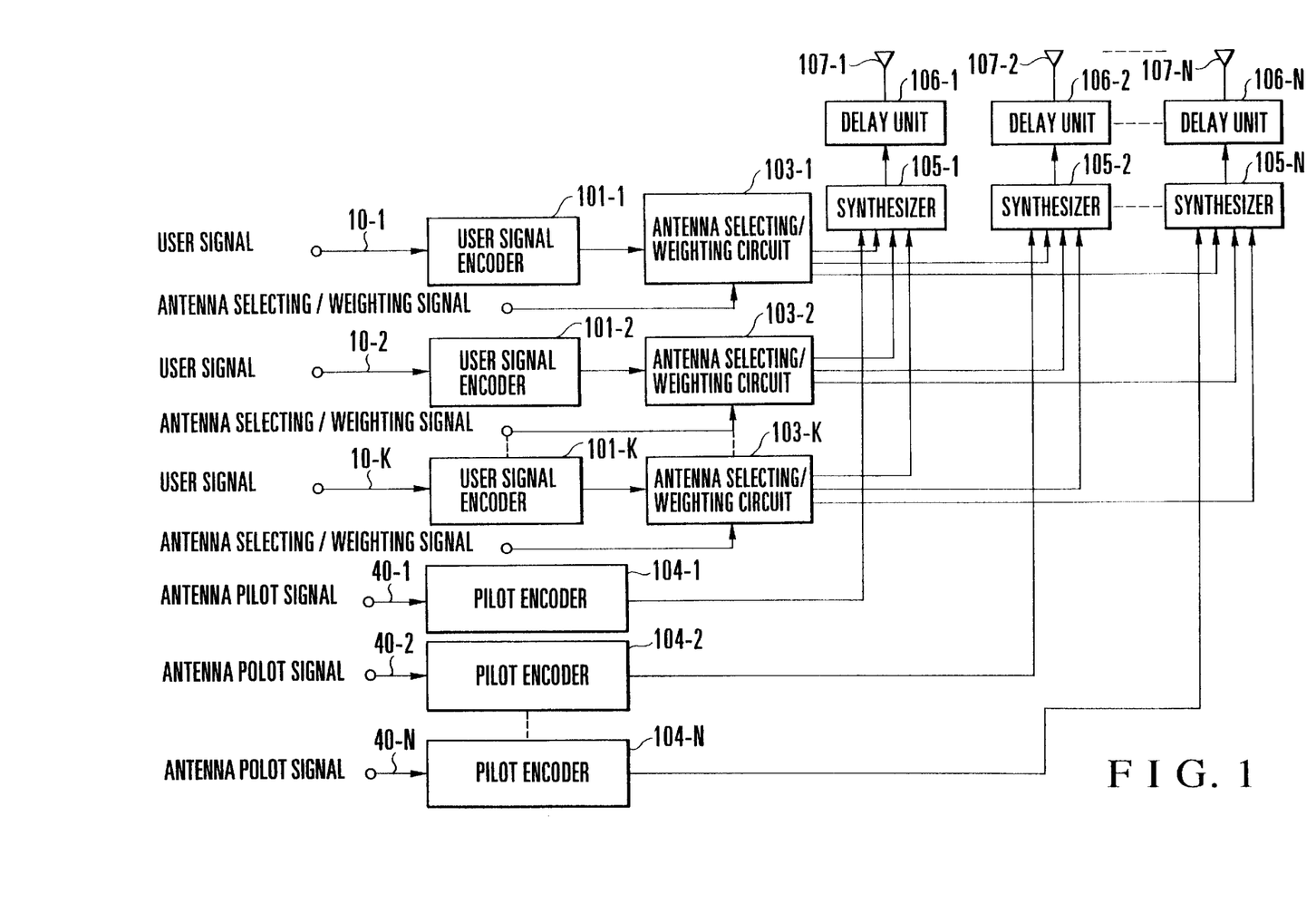
FIG. 1 is a block diagram showing the arrangement of an embodiment of a CDMA transmitter in a CDMA transmission/reception system of the present invention.
Figure 2:
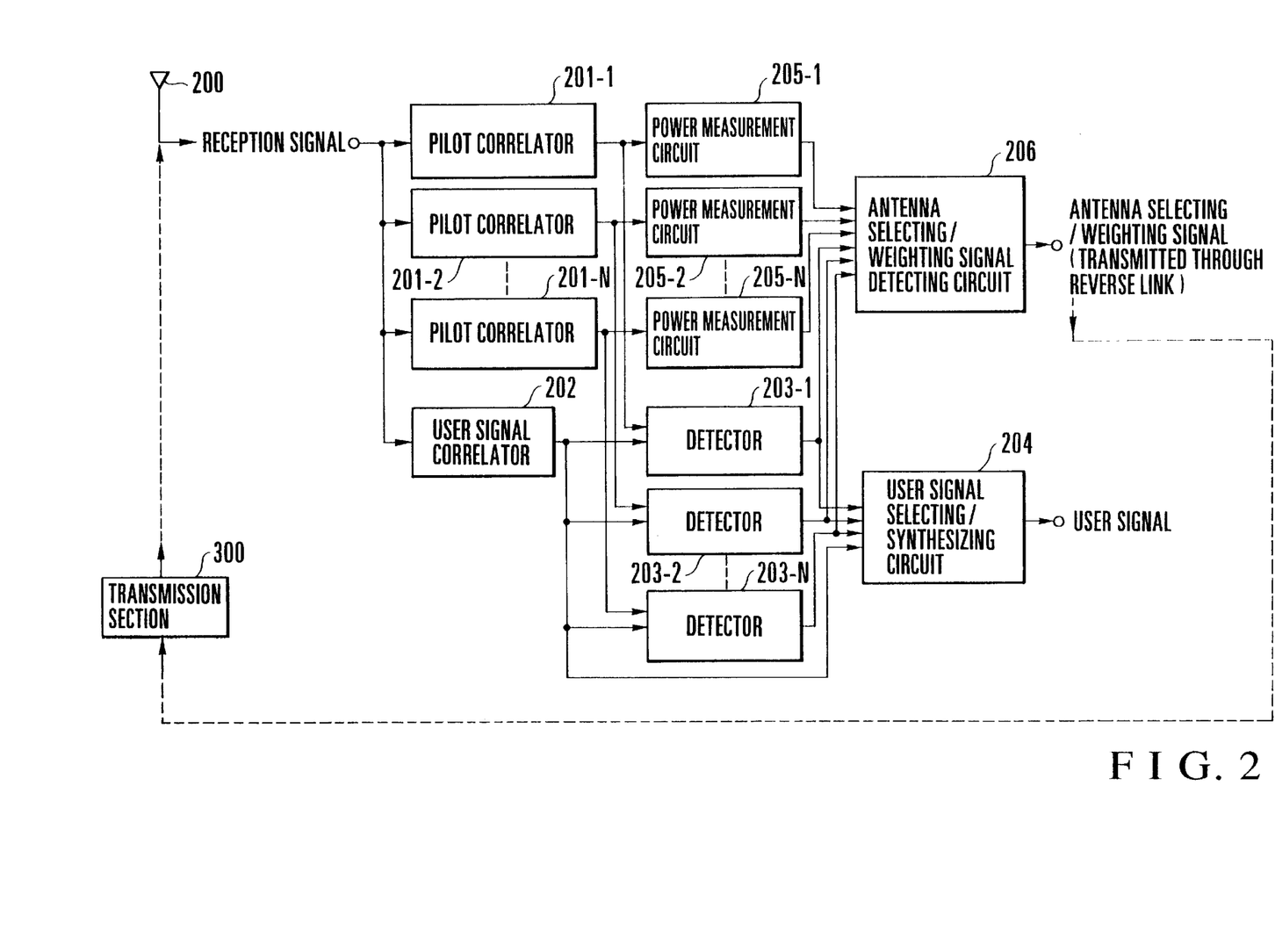
FIG. 2 is a block diagram showing the arrangement of an embodiment of a CDMA receiver in the CDMA transmission/reception system of the present invention.

FIG. 1 shows the arrangement of a CDMA transmitter TR in a CDMA transmission/reception system according to an embodiment of the present invention. FIG. 2 shows the arrangement of a CDMA receiver RV in the CDMA transmission/reception system of the present invention.

Referring to FIG. 1, in the transmitter TR, user signal spreading circuits 101-1 to 101-K respectively spread user signals 10-1 to 10-K from K stations with unique codes assigned to the respective users. Antenna selecting/weighting circuits 103-1 to 103-K select transmission antennas from N antennas 107-1 to 107-N for the respective users by using antenna selection signals or weighting signals obtained for the respective users, or weight the signals and transmit the resultant signals to the antennas 107-1 to 107-N.

Figure 3A:
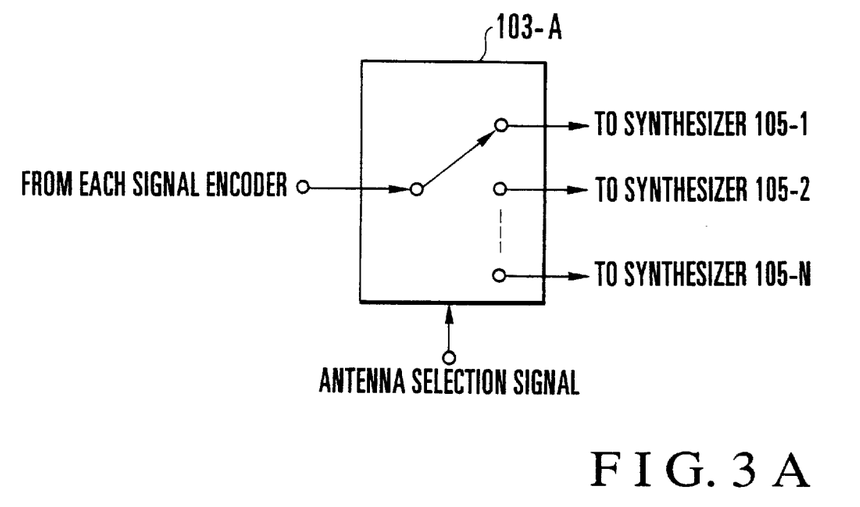
FIGS. 3A and 3B are block diagrams each showing an example of the arrangement of an antenna selecting/weighting circuit.
Figure 3B:
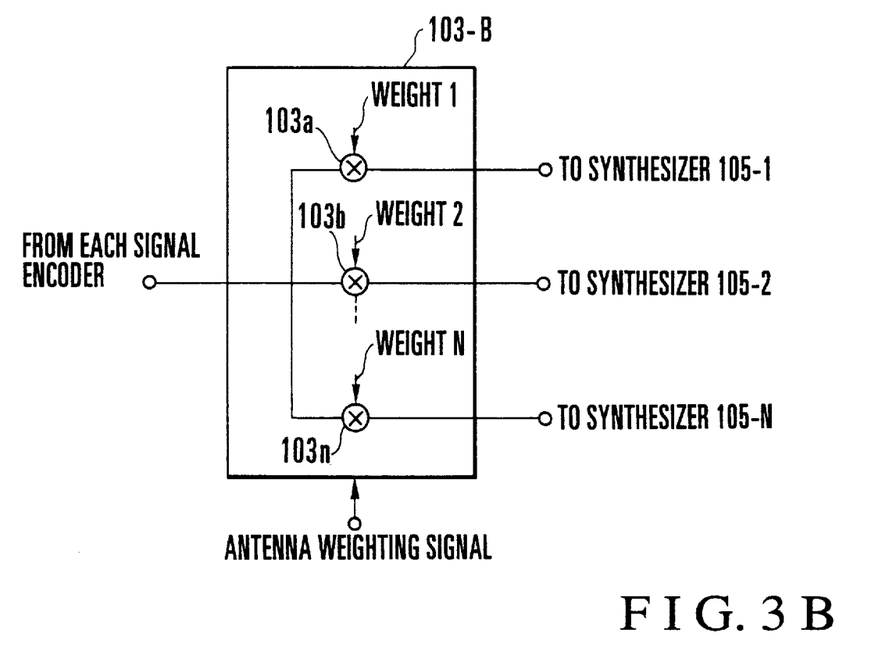

FIGS. 3A and 3B show the arrangement of the antenna selecting/weighting circuit 103. FIG. 3A shows an antenna selection scheme using an antenna selection signal. FIG. 3B shows a scheme using a weighting circuit 103-i (i=1 to K).

In the antenna selection scheme in FIG. 3A, a selecting circuit 103A determines, on the basis of an antenna selection signal, a specific signal combiner to which a signal from each spreading circuit is to be output.

In the weighting scheme in FIG. 3B, for a signal from each spreading circuit, weights 1, 2, ..., N are respectively assigned to arithmetic units 103a, 103b, ..., 103n in a weighting circuit 103B on the basis of an antenna weighting signal. The resultant signals are output to signal combiners 105-1, 105-2, ..., 105-N. Note that the antenna selection scheme is a modification of the weighting scheme, and can be regarded as a scheme of performing a weighting operation to output a signal from each spreading circuit to only one signal combiner (antenna). In other words, a signal with a weight "1" is output to only one signal combiner, while a signal with a weight "0" is output to each of the remaining signal combiners (transmission antennas) to which no outputs are sent.

In the combining scheme, a user signal to an antenna for a good transmission channel is multiplied by a large weight, whereas a user signal to an antenna for a poor transmission channel is multiplied by a small weight.

Referring back to FIG. 1, pilot signal spreading circuits 104-1 to 104-N (N is an integer not less than two; the same applies to the following description) respectively spread pilot signals 40-1 to 40-N for the antennas 107-1 to 107-N with unique codes assigned to the respective spreading circuits. The signal combiners 105-1, 105-2, ..., 105-N add outputs from the antenna selecting/weighting circuits 103-1 to 103-K to outputs from the pilot signal spreading circuits 104-1 to 104-N. Delay units 106-1 to 106-N respectively delay outputs from the signal combiners 105-1, 105-2, ..., 105-N to set different transmission timings of signals from the antennas 107-1 to 107-N. The purpose of this operation is to separate the user signals transmitted from the antennas 107-1 to 107-N along the time axis to allow easy identification of the antennas from which the respective signals are transmitted. The delay amounts in the delay units 106-1 to 106-N are preferably set to several chip periods, assuming that a timing variation between antennas 107-1 to 107-N is larger than a delay dispersion of transmission channels and is regarded as a time shorter than a one-symbol period of a user signal. The antennas 107-1 to 107-N transmit the outputs from the delay units 106-1 to 106-N.

Referring to FIG. 2, in the receiver RV, pilot correlators 201-1 to 201-N detect pilot signals corresponding to transmission antennas from a received signal obtained from one reception antenna 200, and extract reception timings corresponding to radio waves from the respective transmission antennas and transmission channel parameters. A user signal correlator 202 detects desired user signals from the received signals obtained from the reception antenna 200 at the respective reception timings. In this case, the user signals are separated from each other along the time axis in accordance with the transmission timings of the signals from the transmission antennas.

The problem in the selection scheme, in particular, is that the transmission antenna from which a user signal has been transmitted cannot be accurately identified on the receiver RV. Although an antenna selection signal is detected by the receiver RV, no user signal may be transmitted from an antenna identified by the receiver RV when an error is caused in information when it is transmitted through a different line.

For this reason, the receiver RV must estimate, by itself, a transmission antenna from which a user signal has been transmitted. In this embodiment, user signals are detected in correspondence with all the transmission antennas from which a user signal has been possibly transmitted, and a demodulated signal from the transmission antenna from which the user signal has been transmitted most possibly is used. Detectors 203-1 to 203-N detect user signals at reception timings corresponding to the respective transmission antennas by using transmission channel parameters output from the pilot correlators 201-1 to 201-N, and obtain N outputs. A user signal selecting/combining circuit 204 selects the most likely output from the outputs from the user signal correlator 202 and the outputs from the detectors 203-1 to 203-N, or combines these outputs to obtain a user signal.

Figure 4A:
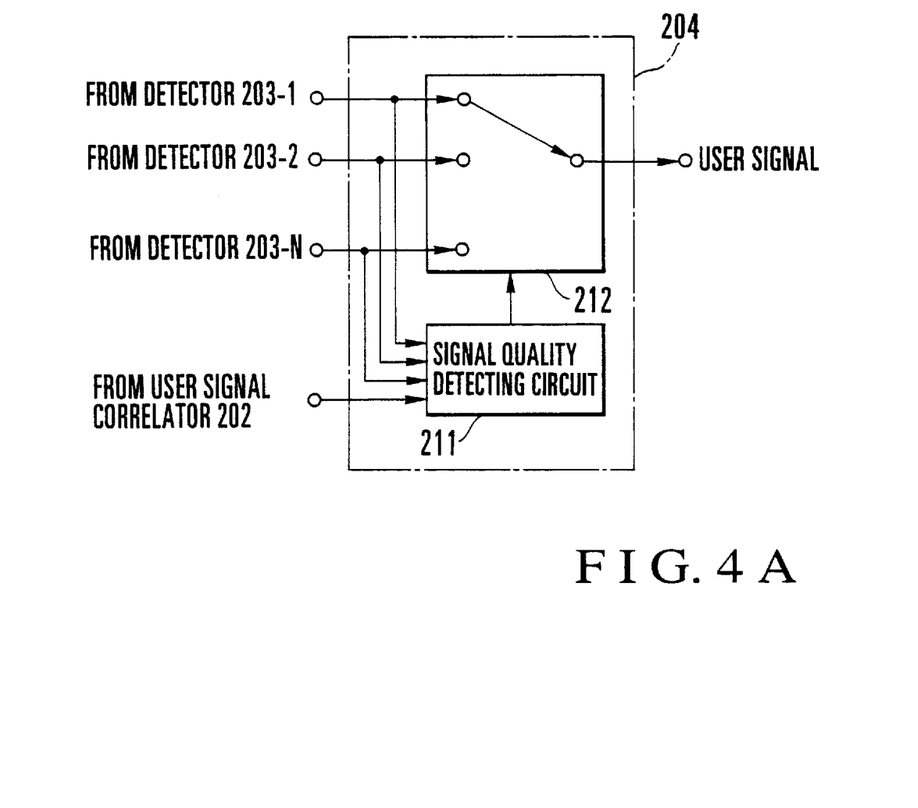
FIGS. 4A and 4B are block diagrams each showing an example of the arrangement of a user signal selecting/combining circuit.
Figure 4B:
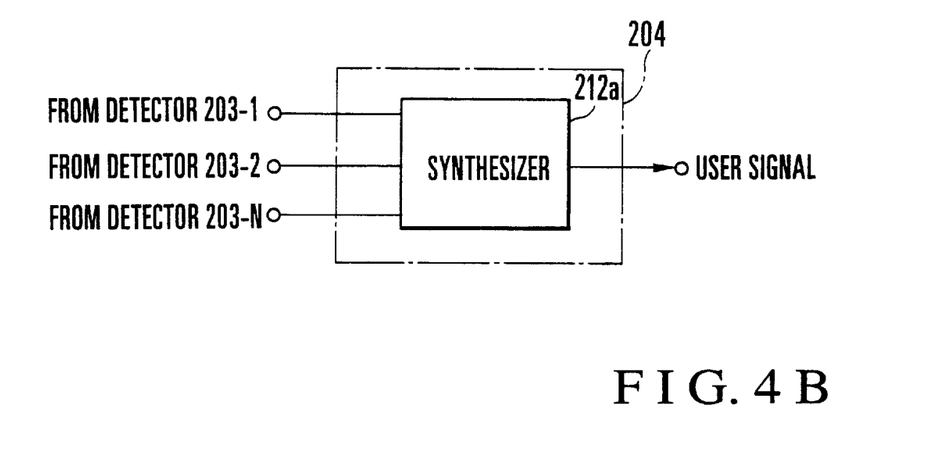

Each of FIGS. 4A and 4B shows an example of the user signal selecting/combining circuit 204. FIG. 4A shows an arrangement for the selection scheme. Referring to FIG. 4A, for example, the signal quality detecting circuit 211 receives outputs from the user signal correlator 202, obtains the symbol powers of output values at reception timings corresponding to the respective antennas, and adds up the powers corresponding to an antenna control period. In this case, since no output appears at the reception timing of a radio wave from a transmission antenna from which no signal has been transmitted, a transmission antenna can be specified by selecting the maximum detected value (the maximum reception power value) of these detected values.

Letting $I_N$ and $Q_N$ be quadrature signal outputs at reception timings corresponding to transmission antennas and output from the user signal correlator 202, an output $d_N$ from a signal quality detecting circuit 211 is given by $$d_N = \Sigma(I_N^2 + Q_N^2) \quad (1)$$

In equation (1), $\Sigma$ is the number of symbols included in an antenna control period. If outputs from the detectors 203-1 to 203-N are used, coherent detection can be performed.

Letting $I_N$ and $Q_N$ be the quadrature signal outputs from the detector 203-N, an output $d_N$ from the signal quality detecting circuit 211 is given by $$d_N = \Sigma(|I_N| + |Q_N|) \quad (2)$$

In equation (2), $\Sigma$ is the number of symbols included in an antenna control period. A selecting circuit 212 selects one of the outputs from the detectors 203-1 to 203-N as a user signal on the basis of the output $d_N$.

In the arrangement for the combining scheme, shown in FIG. 4B, since a weighting operation has already been performed by the transmitter, outputs from the detectors 203-1 to 203-N are directly combined by a signal combiner 212a to obtain a demodulated signal (user signal).

Power measurement circuits 205-1 to 205-N in FIG. 2 respectively measure outputs from the pilot correlators 201-1 to 201-N. An antenna selecting/weighting signal detecting circuit 206 detects antenna signals from outputs from the power measurement circuits 205-1 to 205-N, or antenna weighting signals from outputs from the power measurement circuits 205-1 to 205-N and the detectors 203-1 to 203-N. For example, in the antenna selection scheme, a transmission antenna corresponding to a pilot signal having the maximum power of the outputs from the power measurement circuits 205-1 to 205-N is selected.

In the combining scheme, weights are obtained from the outputs from the power measurement circuits 205-1 to 205-N and directly transmitted. Alternatively, comparison data of weights obtained from the outputs from the power measurement circuits 205-1 to 205-N and weights obtained from the outputs from the detectors 203-1 to 203-N and actually used in the transmitter TR may be transmitted. In the combining scheme, it is difficult to transmit weighting information from the receiver to the transmitter in a relatively small amount, and complicated control is required.

An output from the antenna selecting/weighting signal detecting circuit 206, i.e., an antenna selection/weighting signal is sent to a transmission section 300 and transmitted to the transmitter TR via the reception antenna 200. FIG. 2 shows only a portion of the receiver RV which is associated with the present invention, but the remaining portion which is not directly associated with the present invention is omitted. Note that since the FDD scheme is used in this case, different radio frequencies are used for transmission and reception. This FDD scheme is known.

In this embodiment, an antenna selection signal or weighting signal used in the transmitter TR must be detected by the receiver RV and transmitted from the receiver RV to the transmitter TR via a link (reverse link) different from a link used to transmit a user signal. For this reason, there is a delay between the instant at which an antenna control signal is detected by the receiver RV and the instant at which the signal is transmitted to the transmitter TR and antenna control is performed. This delay is generally two to three times an antenna control period. If a fading path variation is fast, a change in transmission channel occurs during this delay period, resulting in erroneous antenna control. Since the transmission channel variation speed is proportional to the speed of a mobile station, a diversity effect and an interference reduction effect can be expected in a low-speed mobile station, but such effects cannot be expected in a high-speed mobile station. Antenna control can be properly performed in environments in which low-speed mobile stations are mainly present, e.g., microcell and indoor systems. However, in a microcell system in which high-speed mobile stations make up a large proportion, reception quality varies depending on mobile stations. In this case, by performing transmission power control for each mobile station, constant reception quality can be maintained in all the mobile stations, and the overall interference amount of the system can be optimized.

Another embodiment of the CDMA transmission/reception system of the present invention will be described with reference to FIGS. 5 and 6.

Figure 5:
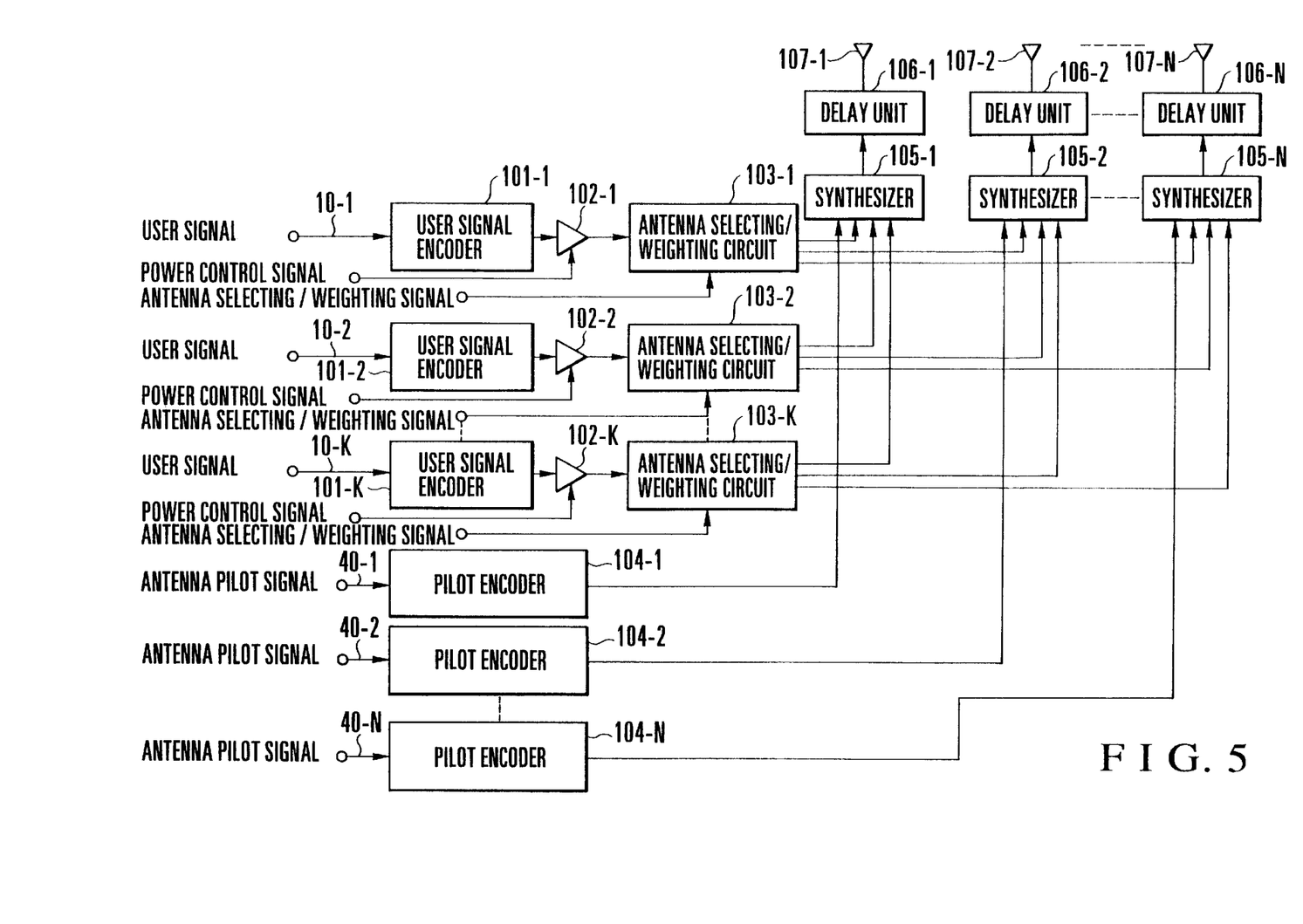
FIG. 5 is a block diagram showing the arrangement of another embodiment of the CDMA transmitter in the CDMA transmission/reception system of the present invention.

FIG. 5 shows the arrangement of another embodiment of the CDMA transmitter in the CDMA transmission/reception system of the present invention. FIG. 6 shows the arrangement of another embodiment of the CDMA receiver in the CDMA transmission/reception system of the present invention. The same reference numerals in FIGS. 5 and 6 denote the same parts as in FIGS. 1 and 2.

Figure 6:
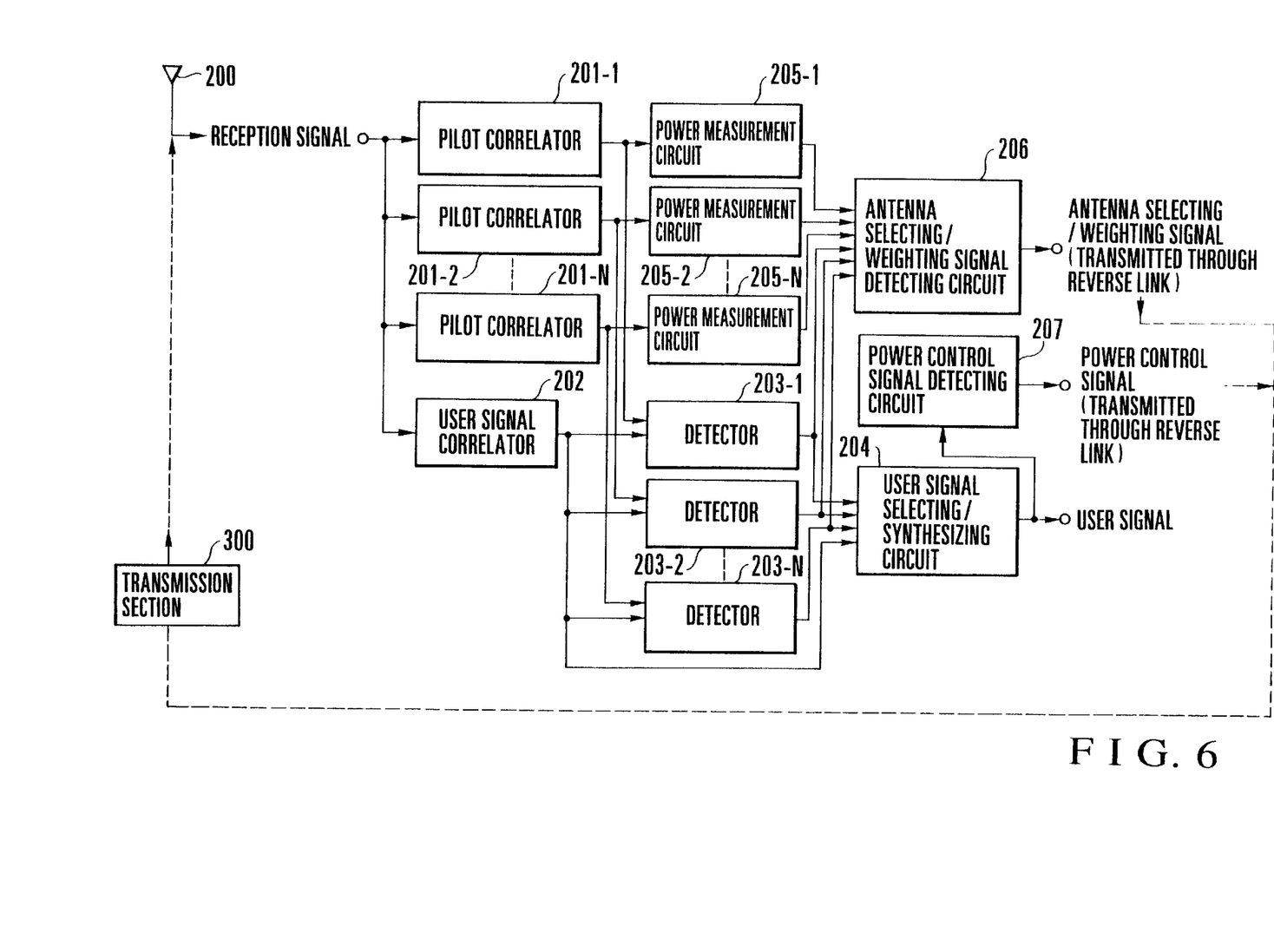
FIG. 6 is a block diagram showing the arrangement of another embodiment of the CDMA receiver in the CDMA transmission/reception system of the present invention.

The arrangements in FIGS. 5 and 6 are the same as those in FIGS. 1 and 2 except for the addition of an arrangement for controlling transmission power.

Referring to FIG. 5, in a transmitter TR, power control circuits 102-1 to 102-K respectively receive outputs from user signal spreading circuits 101-1 to 101-K, and control transmission power for each user signal by using a power control signal obtained for each user. Outputs from the power control circuits 102-1 to 102-K are supplied to antenna selecting/weighting circuits 103-1 to 103-K.

Referring to FIG. 6, in a receiver RV, a power control signal detecting circuit 207 receives an output from a user signal selecting/combining circuit 204, and detects a power control signal on the basis of, e.g., desired signal-to-interference power measurement. It suffices if transmission power control used in this case is performed to control the average value of reception levels. In addition, the response speed of this control may be low as compared with an antenna control period. Various desired signal-to-interference power measurement methods are available. For example, U.S. Pat. No. 4,835,790 discloses a scheme in "Carrier-to-Noise Detector for Digital Transmission Systems". The power control signal is transmitted from the receiver RV to the transmitter TR via a link (reverse link) different from a link used to transmit a user signal.

Still another embodiment of the CDMA transmission/reception system of the present invention will be described with reference to FIGS. 7 and 8.

Figure 7:
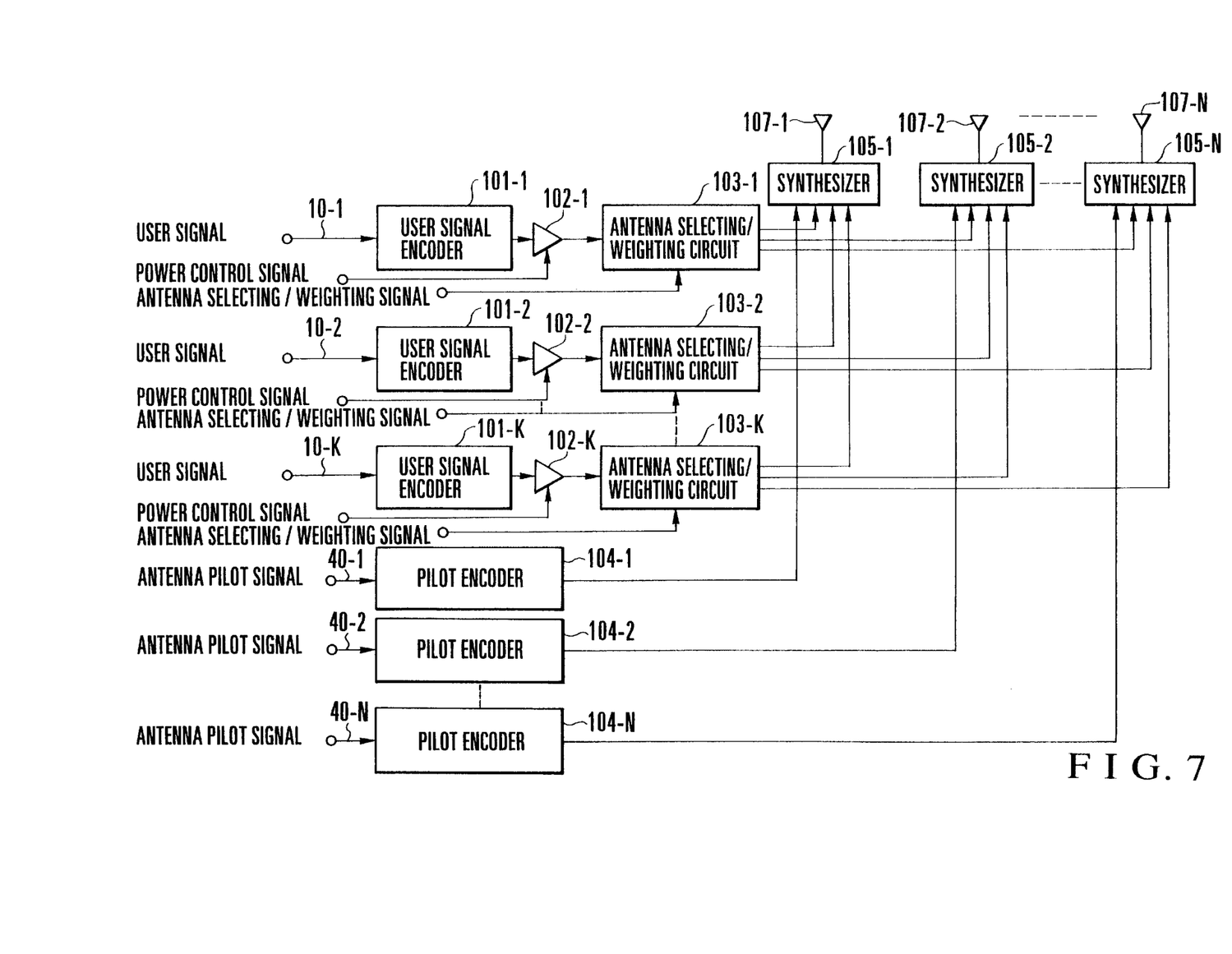
FIG. 7 is a block diagram showing the arrangement of still another embodiment of the CDMA transmitter in the CDMA transmission/reception system of the present invention.

FIG. 7 shows the arrangement of still another embodiment of the CDMA transmitter in the CDMA transmission/reception system of the present invention. FIG. 8 shows the arrangement of still another embodiment of the CDMA receiver in the CDMA transmission/reception system of the present invention. The same reference numerals in FIGS. 7 and 8 denote the same parts as in FIGS. 1 to 6.

This embodiment is a modification of the embodiment shown in FIGS. 5 and 6. The essential idea of this embodiment is based on the embodiment shown in FIGS. 5 and 6. In the embodiment shown in FIGS. 7 and 8, the delay units 106-1 to 106-N in FIG. 1 are omitted, and user signals are not separated along the time axis in correspondence with the transmission antennas in an output from a user signal correlator 202. For this reason, in the arrangement shown in FIGS. 5 and 6, a correct output can be obtained only from a transmission channel having undergone proper compensation processing, and the remaining outputs are not 0 but are multiplied by erroneous transmission channel parameters, unlike in the arrangement shown in FIGS. 1 and 2, in which outputs from the detectors 203-1 to 203-N are set to almost 0 except for a correct one. In this embodiment, therefore, identification cannot be performed by the signal quality detecting circuit 211 indicated by equation (1), but can be performed by the method indicated by equation (2).

Figure 8:
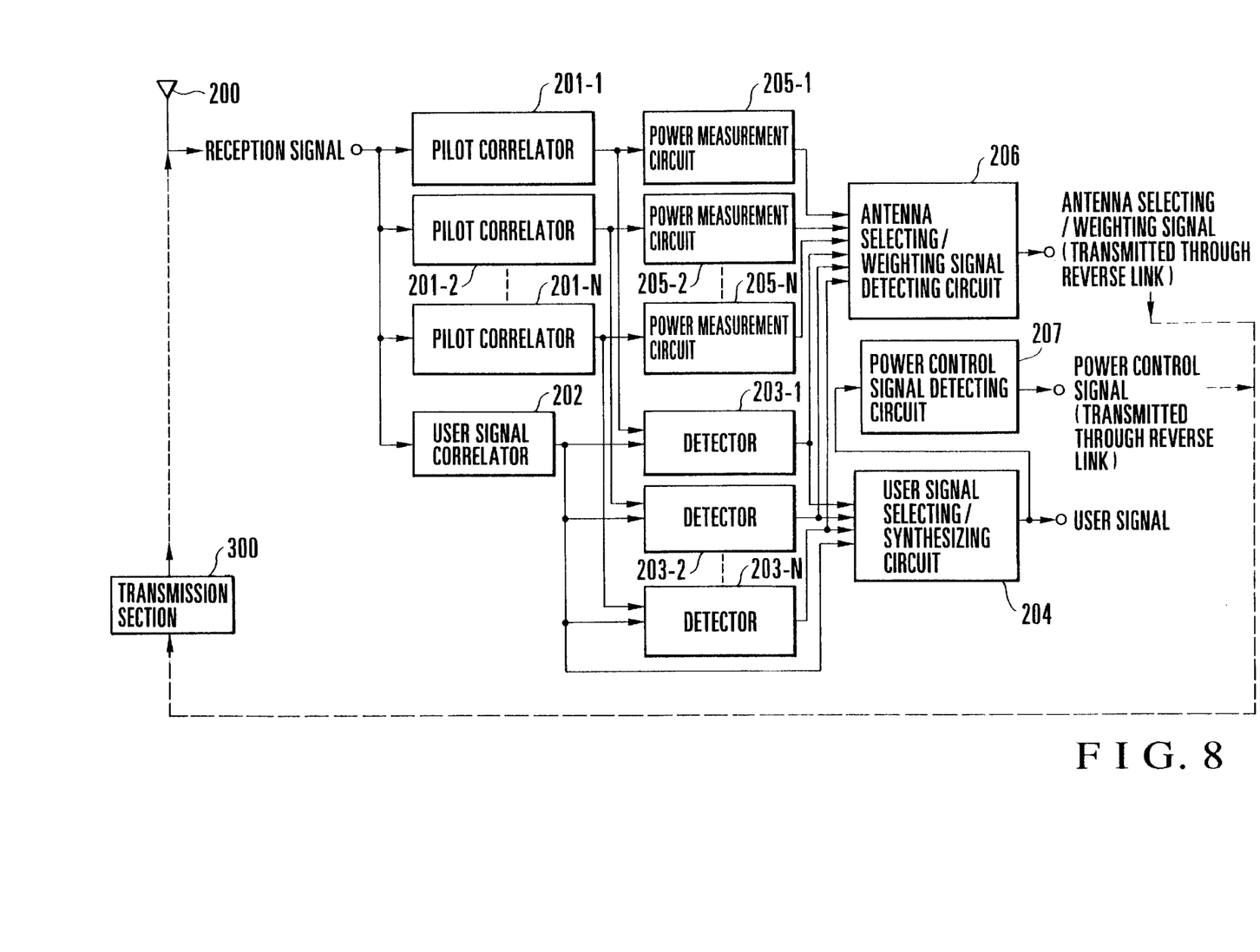
FIG. 8 is a block diagram showing the arrangement of still another embodiment of the CDMA receiver in the CDMA transmission/reception system of the present invention.

In the embodiment shown in FIGS. 7 and 8, pilot signals are used for detection. If, however, a pilot symbol is inserted in each user signal on the time axis in advance, and the receiver performs detection by using such a signal (Sampei, "Rayleigh Fading Compensation Method for 16QAM MODEM in Digital Land Mobile Radio Systems", THE TRANSACTIONS OF THE INSTITUTE OF ELECTRONICS, INFORMATION AND COMMUNICATION ENGINEERS, B-II, Vol. J72-B-II, No. 1, Jan. 1989), the user signal selecting circuit can be omitted. However, even if a pilot signal having a high intensity is transmitted, the signal is not used, which is not preferable in terms of detection characteristics and transmission efficiency. As is apparent, the embodiment shown in FIGS. 7 and 8 may use a scheme of using different codes in user signals for the respective antennas as in the case of pilot signals.

Still another embodiment of the CDMA transmission/reception system of the present invention will be described with reference to FIGS. 9 and 10.

Figure 9:
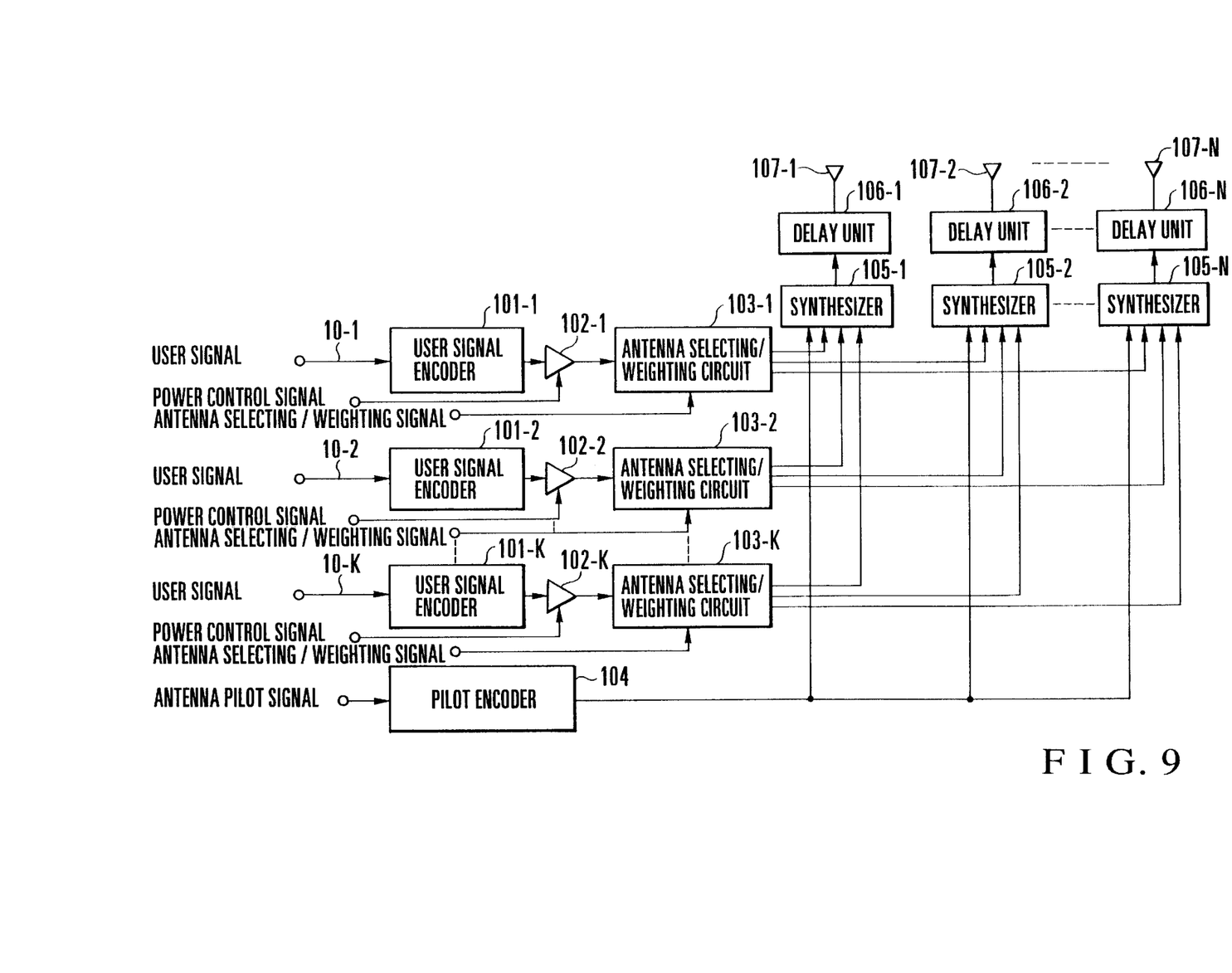
FIG. 9 is a block diagram showing the arrangement of still another embodiment of the CDMA transmitter in the CDMA transmission/reception system of the present invention.
Figure 10:
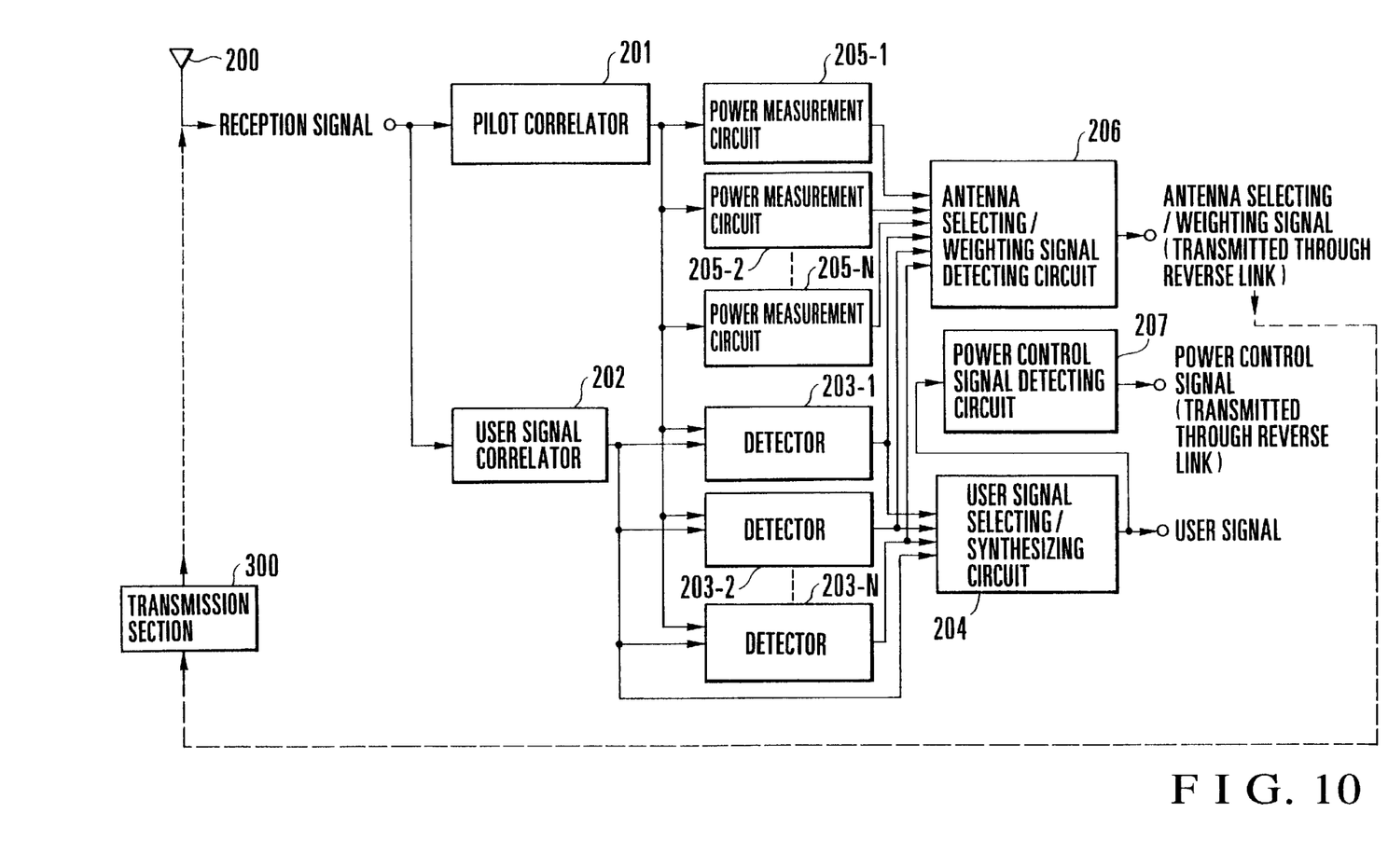
FIG. 10 is a block diagram showing the arrangement of still another embodiment of the CDMA receiver in the CDMA transmission/reception system of the present invention.

FIG. 9 shows the arrangement of still another embodiment of the CDMA transmitter in the CDMA transmission/reception system of the present invention. FIG. 10 shows the arrangement of still another embodiment of the CDMA receiver in the CDMA transmission/reception system of the present invention. The same reference numerals in FIGS. 9 and 10 denote the same parts as in FIGS. 1 to 8.

This embodiment includes only one pilot signal spreading circuit identical to each of the pilot signal spreading circuits in the arrangement shown in FIG. 5. In the embodiment, pilot signals which are spread with identical codes are transmitted from the respective transmission antennas. Referring to FIG. 9, delay units 106-1 to 106-N shift the transmission timings of signals from each other. Referring to FIG. 10, therefore, antennas can be identified in the receiver by separating these signals from each other along the time axis by using one pilot correlator 201. It is, however, difficult to accurately specify reception timings corresponding to the respective transmission antennas in an environment in which multipath waves are present.

In the systems of the embodiments described above, different spread codes for pilot signals are used for the respective antennas, or different transmission timings of pilot signals are set for the respective transmission timings to obtain the same effect as that obtained when different codes are used. With this operation, in the receiver, a transmission antenna having good transmission characteristics can be specified by measuring the reception power value of each pilot signal. Thus, transmission diversity can be realized.

In each CDMA transmission/reception system described above, since transmission diversity using closed loop control based on the transmitter and the receiver is realized in the FDD/CDMA scheme, a diversity effect and an interference reduction effect can be expected using neither a plurality of antennas nor any interference canceler in a mobile station. In addition, by using transmission power control for each user signal as well, the transmission power to a low-speed mobile station, in which a diversity effect is remarkable, can be decreased, and interference to a high-speed mobile station can be reduced. As a result, the overall characteristics of the system can be optimized.

What is claimed is:

1. An FDD/CDMA transmission/reception system comprising:

a CDMA transmitter and a CDMA receiver, said CDMA transmitter including a plurality of transmission antennas, signal transmission means for transmitting transmission signals weighted by different values to said respective transmission antennas, and pilot signal transmission means for transmitting a plurality of different pilot signals to said respective transmission antennas, and said CDMA receiver including reception means for obtaining one received signal from the transmission signals from said plurality of transmission antennas of said CDMA transmitter in consideration of reception quality, and means for transmitting antenna control signals corresponding to reception power values of the received pilot signals to said CDMA transmitter.

2. A system according to claim 1, wherein the pilot signals are pilot signals which are spread with different codes for said respective transmission antennas.

3. A system according to claim 1, wherein the pilot signals are pilot signals which are spread with identical codes and for which different transmission timings are set for said respective transmission antennas.

4. A system according to claim 1, wherein said signal transmission means transmits the transmission signals, which are weighted on the basis of the antenna control signals corresponding to the reception power values of the pilot signals and transmitted from said CDMA receiver, from said respective transmission antennas.

5. A system according to claim 1, wherein the transmission signals transmitted from said signal transmission means are weighted to be transmitted to one of said plurality of transmission antennas.

6. A system according to claim 1, wherein said CDMA transmitter comprises weighting circuits for weighting the transmission signals, combiners for combining the transmission signals weighted by said weighting circuits with the pilot signals and transmitting the resultant outputs, and delay units for delaying and transmitting the outputs from said combiners to said transmission antennas.

7. A system according to claim 1, wherein said CDMA transmitter comprises power control circuits for controlling powers of the transmission signals on the basis of power control signals, weighting circuits for weighting output signals from said power control circuits, and combiners for combining the output signals weighted by said weighting circuits with the pilot signals, and transmitting the resultant signals to said transmission antennas.

8. A system according to claim 6, wherein said weighting circuit comprises a selecting circuit for selecting the transmission signal on the basis of an antenna selection signal.

9. A system according to claim 7, wherein said weighting circuit comprises a selecting circuit for selecting an output signal from said power control circuit on the basis of an antenna selection signal.

10. A system according to claim 7, wherein further comprising delay units for delaying and transmitting outputs from said combiners to said transmission antennas.

11. A system according to claim 1, wherein said CDMA receiver comprises a pilot signal correlator for detecting the pilot signals, a user signal correlator for detecting the transmission signals, circuits for demodulating the transmission signals on the basis of output signals from said user signal correlator, power measurement circuits for measuring powers of the pilot signals, and a detecting circuit for detecting the antenna control signal on the basis of a measurement output from said power measurement circuit.

12. A system according to claim 11, wherein said demodulating circuit comprises coherent detectors for demodulating output signals from said user signal correlator by using output signals from said pilot signal correlator, a signal quality detecting circuit for detecting a signal quality for output signals from said coherent detectors, and a combiner for combining output signals from said coherent detectors according to the signal quality detected by said signal quality detecting circuit.

13. A system according to claim 11, wherein said detecting circuit detects the antenna control signal on the basis of measurement outputs from said power measurement circuits and output signals from said coherent detectors.

14. A system according to claim 11, further comprising a power control signal detecting circuit for detecting a power control signal for controlling a power of the transmission signal from the transmission signal detected by said demodulating circuit, the detected power control signal being transmitted to said CDMA transmitter.

15. An FDD/CDMA transmission/reception system comprising:
   a CDMA transmitter and a CDMA receiver,
   said CDMA transmitter including a plurality of transmission antennas, a signal transmission device transmitting transmission signals weighted by different values to said respective transmission antennas, and a pilot signal transmission device transmitting a plurality of different pilot signals to said respective transmission antennas, and
   said CDMA receiver including a reception device obtaining one received signal from the transmission signals from said plurality of transmission antennas of said CDMA transmitter in consideration of reception quality, and an antenna control signal device transmitting antenna control signals corresponding to reception power values of the received pilot signals to said CDMA transmitter.

* * * * *